May 8, 1962 W. H. DREYER 3,033,445
DOCUMENT HANDLING APPARATUS
Original Filed Oct. 20, 1958 7 Sheets-Sheet 1
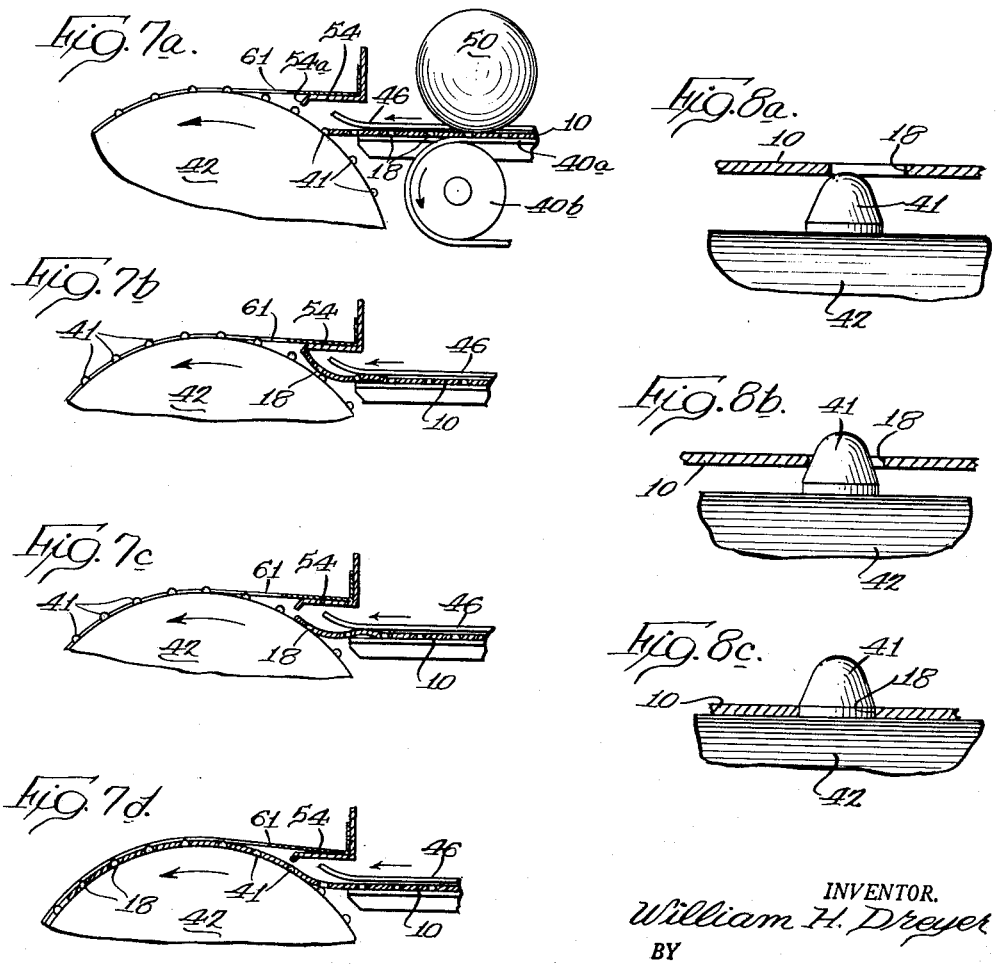
INVENTOR.
William H. Dreyer
BY
Carlson, Pitzner, Hubbard & Wolfe
Attys.

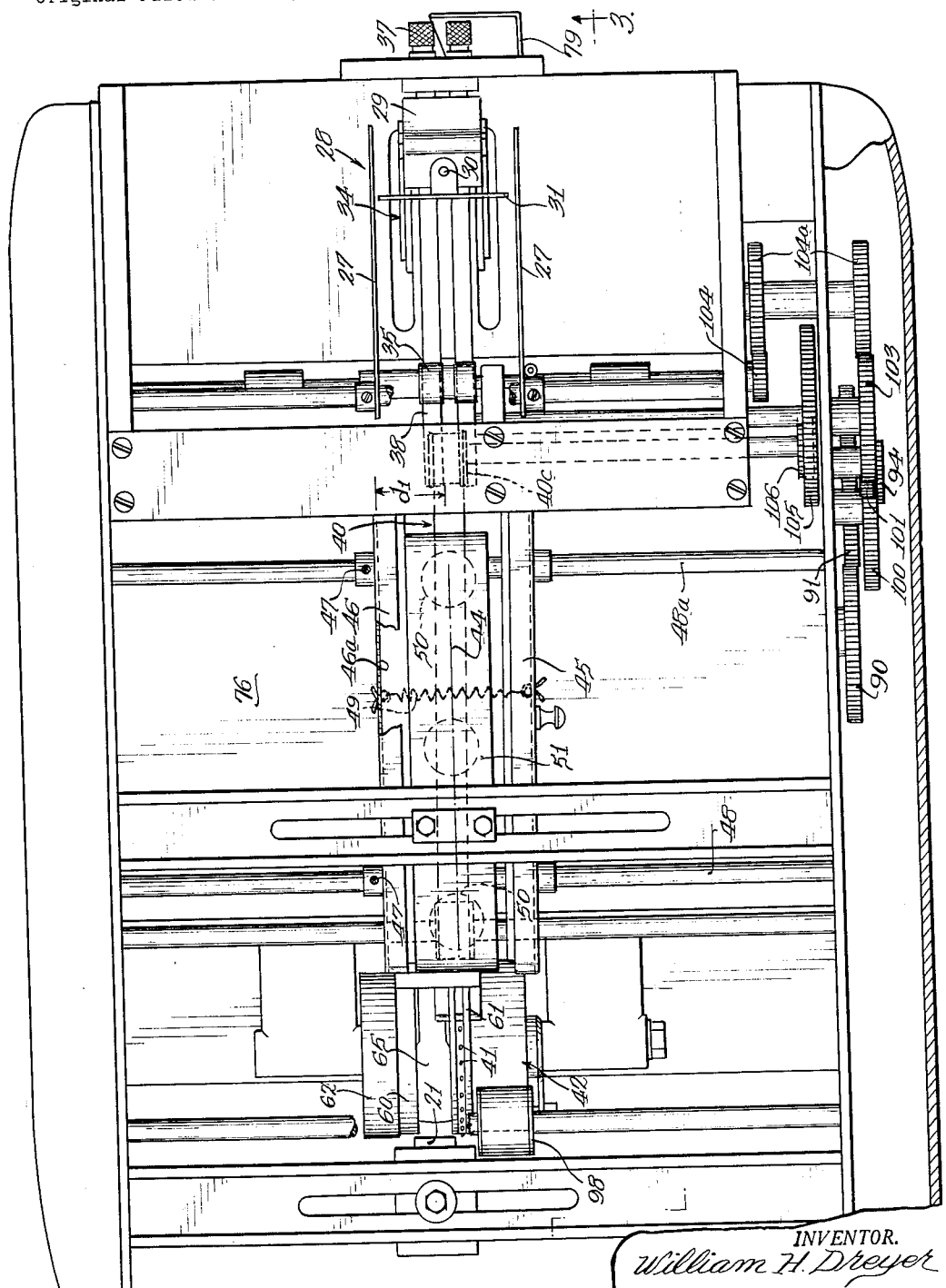

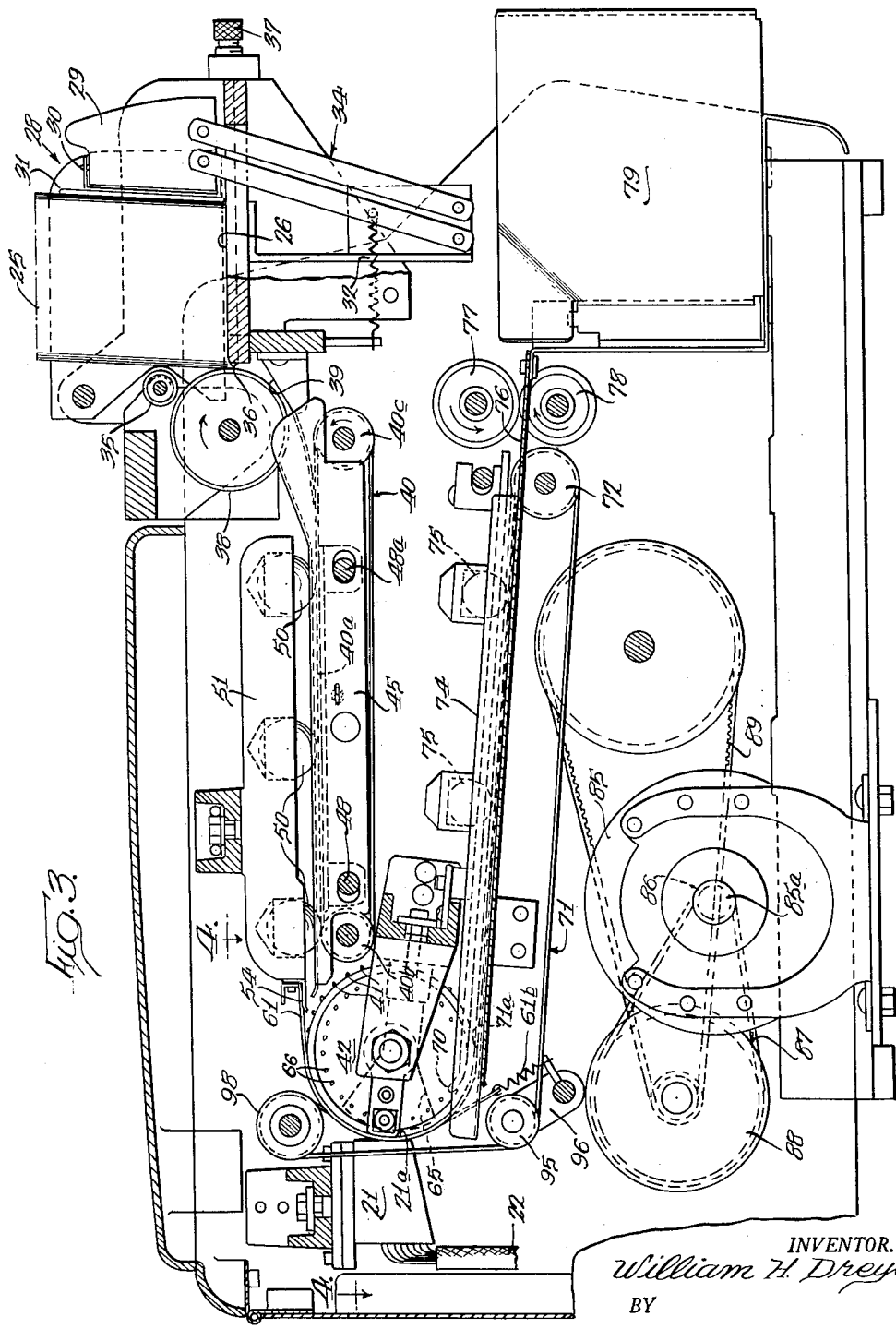

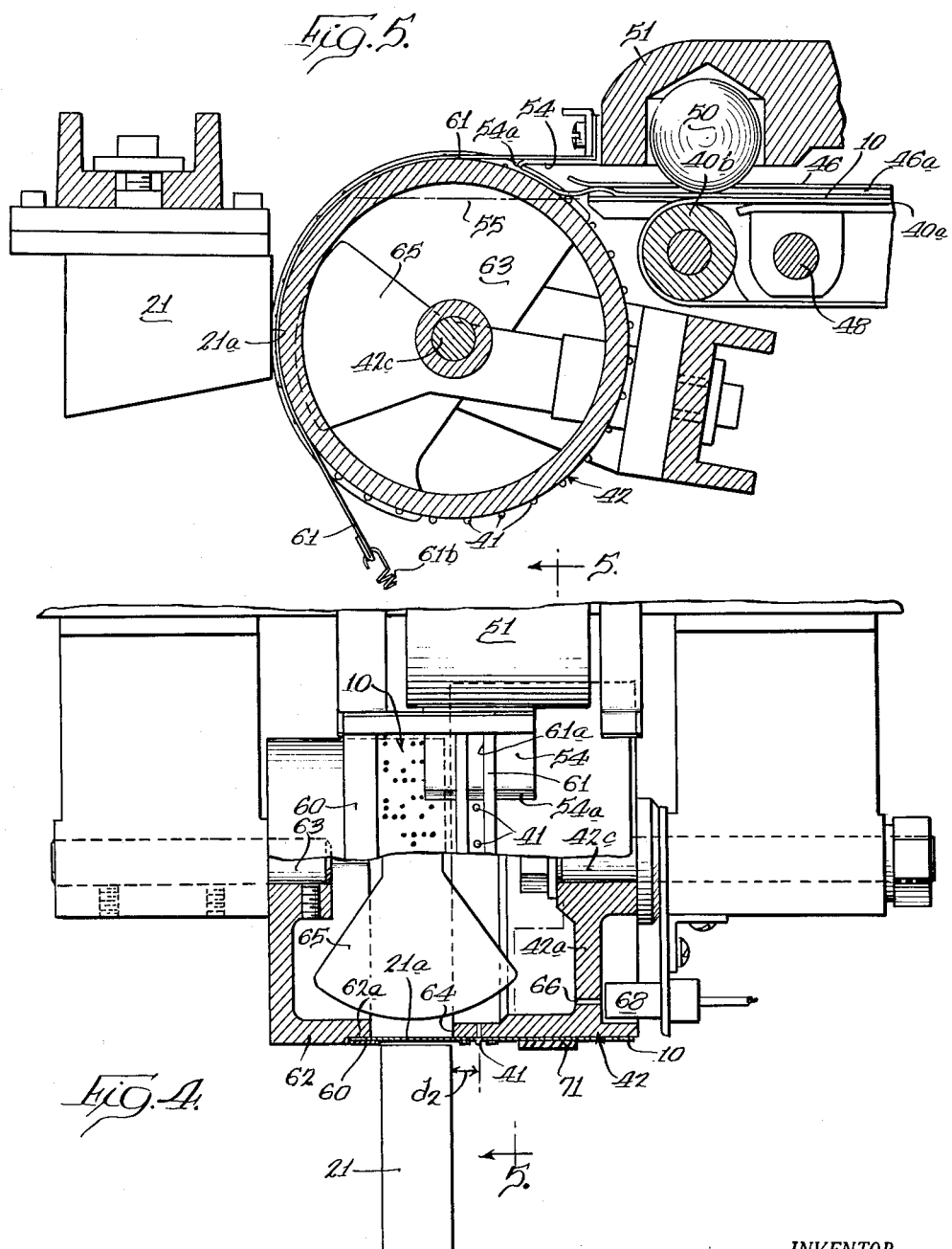

May 8, 1962 W. H. DREYER 3,033,445
DOCUMENT HANDLING APPARATUS
Original Filed Oct. 20, 1958 7 Sheets-Sheet 5

INVENTOR.
William H. Dreyer
BY
Carlson, Pitzner, Hubbard & Wolfe
Attys

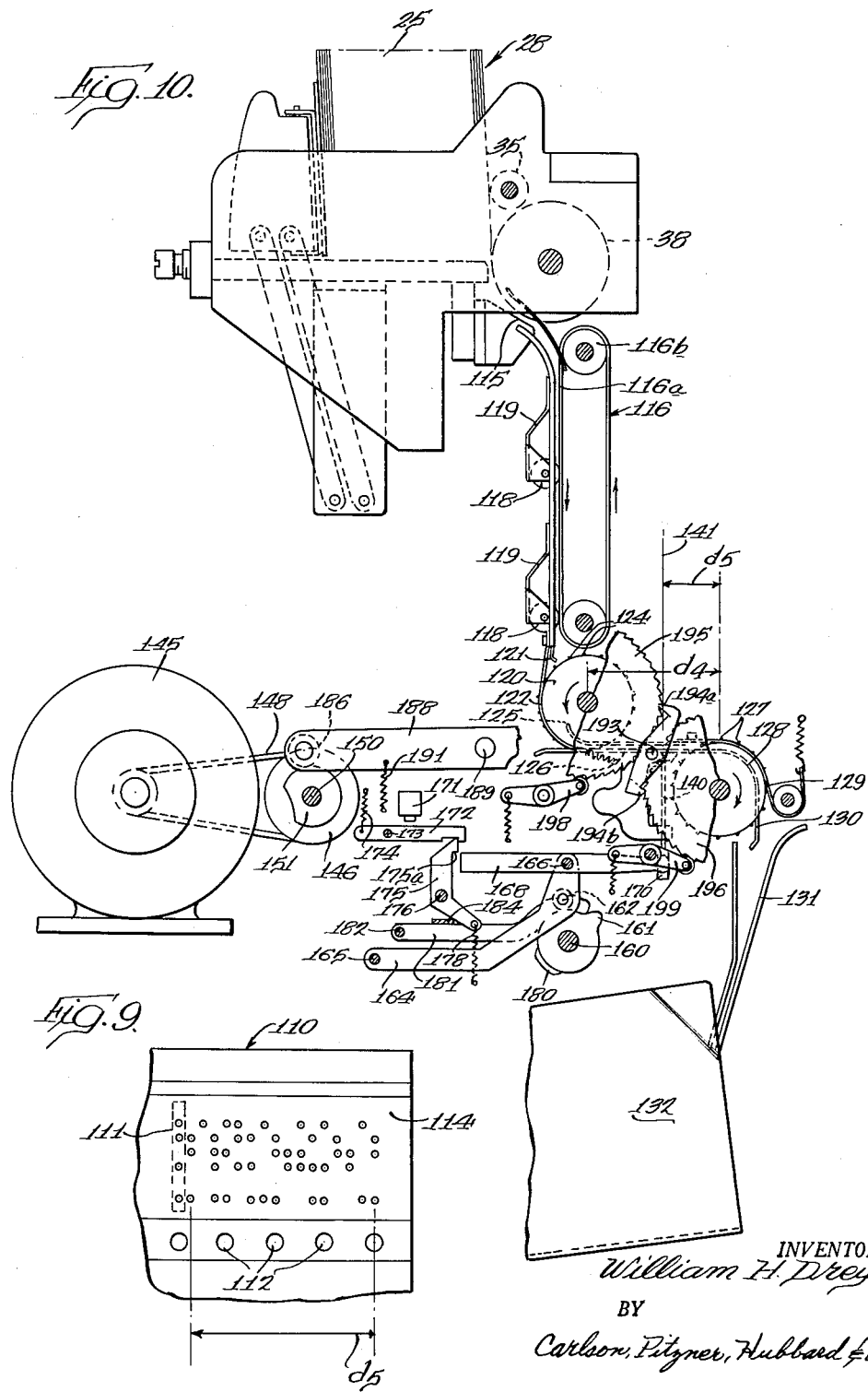

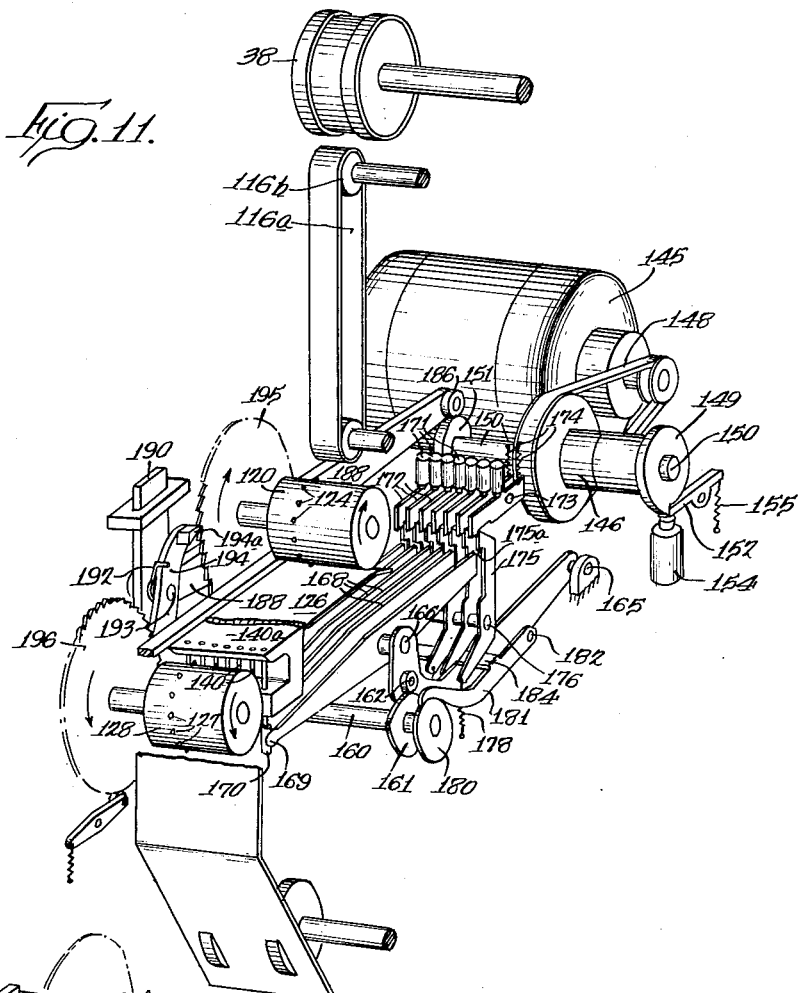

3,033,445
DOCUMENT HANDLING APPARATUS
William H. Dreyer, Skokie, Ill., assignor to Cummins-Chicago Corp., Chicago, Ill., a corporation of Illinois
Continuation of application Ser. No. 768,408, Oct. 20, 1958. This application Dec. 27, 1960, Ser. No. 78,773
27 Claims. (Cl. 234—69)

The present invention relates in general to business machines, and in particular to such machines for handling and operating on separate documents fed therethrough. The term "operating on" as used heerin refers either to the application to or the reading from a document of information bearing indicia of any type.

In recent years there has been increasing use of "automated" business machines such as tabulators, sorters, and posting machines. Most startling in their performance capabilities are electronic "computers" or data processing machines which rapidly perform the various calculating operations previously done mentally or with manually controlled desk machines. Such "computers" work on numbers expressed in an appropriate code notation acceptable to electric and electronic logic circuits. These "computers" cannot "read" numbers which are conventionally printed or written on documents. In processing commercial documents, such as bills, checks, and payment stubs, it has in the past been necessary for a clerk to transcribe those numbers into the code language of a computer on magnetic tape or punched cards after the documents have been returned for processing by the accounting department. The tape or punched cards are used as the carriers of information to be processed by computing apparatus.

Desirably, this transcribing step and its requirement of mental and physical work by human clerks should be eliminated, and the documents "read" directly by apparatus which can supply the necessary signals to a computer, sorter, or other business machines. To a limited extent, this has been accomplished through the well known practice of making documents such as checks or bills in the form of "punched cards." But the format of these punched cards has not been widely acceptable to the large majority of commercial establishments. Such punched cards must be relatively stiff or inflexible, they must be of a uniform size, and the position-coded holes punched therein must be so large and so spread out as to drastically limit the area for and the arrangement of printed legible indicia. Each card must be read as a whole, and its edges must remain true to properly locate it in a reading or punching machine. Bending or creasing of these cards impairs their acceptability in card handling and reading machines.

There are various ways in which information can be represented so as to be susceptible of "reading" by machines. One example is punched paper tape in which a coded combination of holes is perforated in each row across the tape, there being one unique combination of hole positions for each of the several possible characters, i.e., numerical digits, alphabetical characters, etc. The "Flexowriter" code for punched tapes is well known and considered as exemplary. While this form of information coding by perforated holes requires much less space to represent a given amount of information, it has heretofore been employed substantially only on long lengths or reels of paper tape. Attempts to utilize such coded information applied to partial areas or fields on separate documents have been thwarted by what seemed to be an insurmountable, practical difficulty of lining up the fields or areas of each perforated character on each document with the operating means, i.e., hole punching or reading means. Sweeping or scanning systems have been proposed to avoid the alinement problem but they have entailed very complex and expensive apparatus.

It is the general aim of this invention to make practicable the use of small portions or fields on separate documents, the field containing coded indicia such as perforations which can be successfully placed on the documents and read successively therefrom by automatic equipment.

In a more specific sense, it is an object of the invention to solve the alinement problem which has heretofore caused difficulty, and required complex equipment, in the automatic handling of separate documents having partial areas or fields for containing compactly represented information or numercial data.

Another object of the invention is to provide an arrangement which will precisely aline fields of documents, such as checks or coupons made of ordinary flexible paper and having a variety of sizes and shapes, with the operating means in a machine as the documents are fed rapidly and successively therethrough.

It is a further object to eliminate wrinkles or bends in separate documents as information-containing fields are brought into alinement with operating means, so that errors due to distortions in the document itself are minimized.

Still another object is to provide an alinement arrangement which is equally successful whether the separate documents are fed continuously or in small intermittent steps past operating means.

Other objects and advantages will become apparent as the following description proceeds, taken in conjunction with the accompanying drawings, in which:

FIGURE 1 shows a typical document of the type having perforation fields therein and which is successfully handled by the apparatus embodying the present invention;

FIG. 2 is a plan view of a document-handling machine having its top cover removed and embodying the features of the invention;

FIG. 3 is a vertical section, taken substantially along the line 3—3 in FIG. 2;

FIG. 4 is a fragmentary detail view taken substantially along the line 4—4 in FIG. 3, and with certain parts partially broken away for added clarity;

FIG. 5 is a detail view taken in vertical section substantially along the line 5—5 in FIG. 4;

FIGS. 7a–7d are stop-motion views illustrating the action sequence by which a document is alined in a longitudinal reference position on and transferred to a moving support;

FIGS. 8a–8c are sequential stop-motion views illustrating the automatic transverse alinement of a document;

FIG. 9 shows another type of commercial document having information-representing illegible patterns of perforated holes therein;

FIG. 10 is a diagrammatic side elevation of a second type of document-handling machine embodying the features of the invention, and specifically a machine for perforating holes in separate documents;

FIG. 11 is a fragmentary perspective view of the machine shown in FIG. 10; and

FIG. 12 is a fragmentary perspective illustration of still another machine which is similar to the one shown in FIGS. 10 and 11, but adapted to "read" the perforations in documents fed successively thereto.

Figure 6:
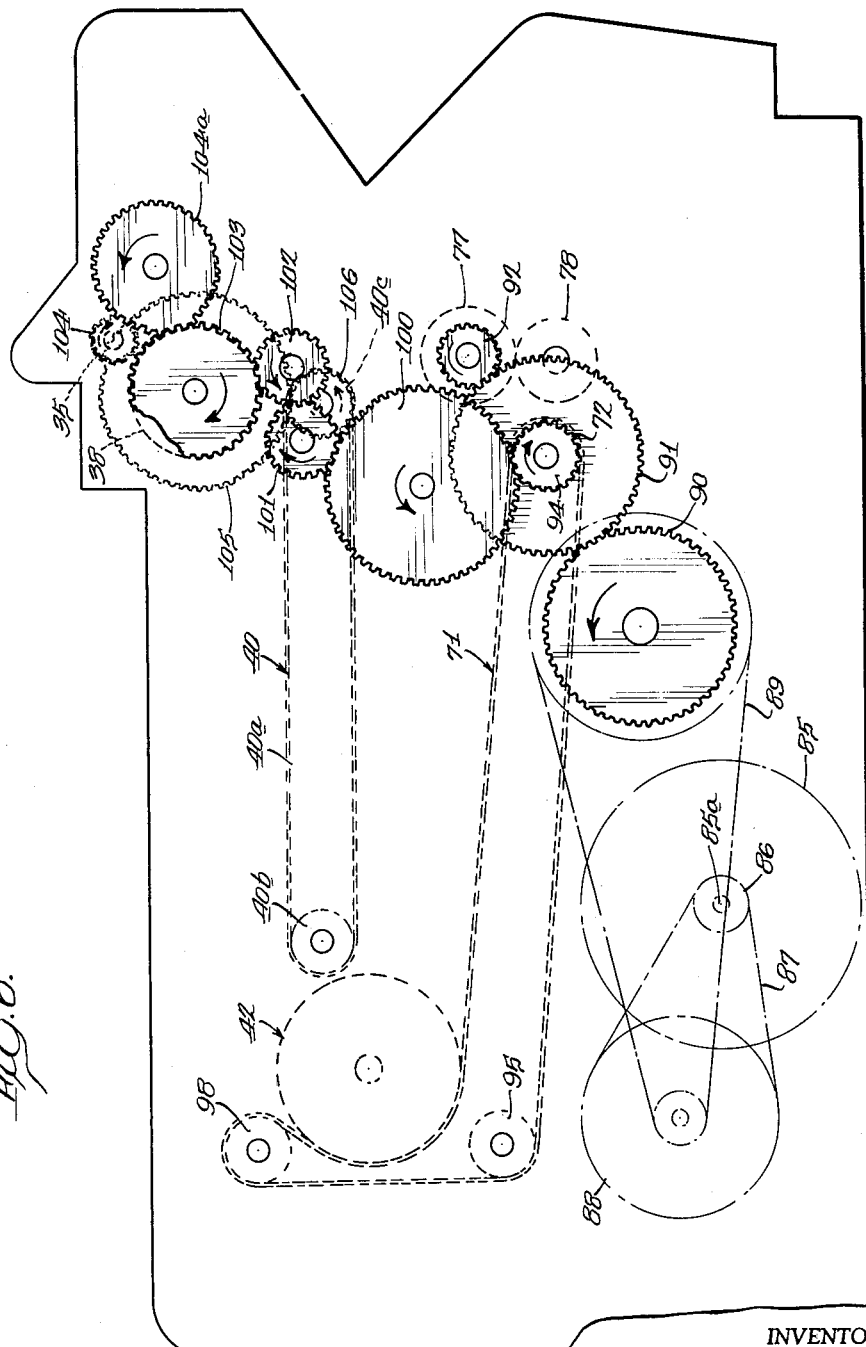
FIG. 6 is a diagrammatic side elevation of the present machine showing drive connections to the moving parts therein.

While the invention has been shown and will be described in some detail with reference to particular embodiments thereof, there is no intention that it thus be limited to such detail. On the contrary, it is intended here to cover all modifications, alterations, and equivalents falling within the spirit and scope of the invention as defined by the appended claims.

Referring now to FIG. 1, a typical payment coupon 10 is there shown as having a strip area 11 which is divided into four lengthwise sections 12–15 for receiving numerical indicia representing a transaction code, an account number, a due date, and an amount due. This is the type of stub or coupon which is made up and forwarded to a customer with a bill, and which is returned to the issuing company at the time that the bill is paid. If payment is indicated by a cashier's stamp in an area 16, the coupon is then used by the accounting department to sum the total receipts, to enter the payment in the customer's account record, or for various other purposes. The paper stock from which the coupon is made is conventional, i.e., quite flexible like the paper used for ordinary bank checks.

As shown in FIG. 1, the essential numerical data associated with the transaction is represented by visible indicia which take the form perforations so patterned or positioned to represent the code number 12, an account number 45678, a due date which is the 21st of the month, and an amount due of $38.24. It will be apparent that each numeral is so represented by punching or perforating holes in a certain combination of eighteen stations arranged in a 3 x 6 matrix. This matrix area is termed a "perforation field," the fields for the digits 4, 5, 6, 7 and 8 being indicated in FIG. 1 by the dotted line rectangles 13a–13e. The term "field" as used herein is intended to denote the area assigned to receive the indicia for any character, regardless as to whether that indicia is legible or illegible in form and irrespective of the manner in which the indicia is applied to the document.

For purposes of alining and translating the document 10, it is provided with an elongated row of uniformly spaced feed holes 18 which are here shown as circular in shape and of a relatively large diameter compared to the diameter of the perforation holes. These feed holes 18 are given reference spacing in each document, regardless of its size, by a distance $d_1$ from a reference edge, here the top edge 19 of the document 10. Moreover, each of the perforation fields is located to have a reference spacing from one of the feed holes 18. As shown in connection with the field 13a, the associated feed hole 18 is located a distance $d_2$ below the lower boundary of that field, and is located a distance $d_3$ to the right of the left side or boundary of the field 13a With this reference spacing, it is known that each field will have a particular position relative to the feed hole associated therewith. Of course, it would be possible to have a smaller number of feed holes and to let two or more of the perforation fields be spaced with reference to a single feed hole.

The foregoing will serve to give an understanding of a typical commercial document which is to be employed in business machines embodying the present invention. It is to be understood, however, that (a) the particular size and shape of the document, (b) its nature, whether a payment coupon, check, bill, inventory slip, or the like, and (c) the particular form of information coding, whether punched holes, magnetic spots, non-reflective spots or the like—are not critical to the advantageous application of the present invention.

It is possible for a clerk to copy down manually the numbers which appear on the document 10 and to post, sum or otherwise process those numbers mentally. It is also possible for a clerk to transcribe, as by typing into special machines, the numbers to convert them into a different form of signals on punched cards, punched tape, or magnetic tape which can be accepted by "computers" or data processing apparatus. Such transcribing may result in errors, and it consumes valuable time. With the increased use of automatic sorters, data processors, and the like, it is highly desirable that the information on documents such as that shown in FIG. 1 be read directly by a machine and translated directly into electrical signals acceptable by the apparatus, or into other record forms which serve as input mediums to computing apparatus.

To simplify the reading of perforated characters in the document 10 automatically and rapidly, or the application of such characters to the document in the first instance, each perforation field in the document should be accurately alined with the reading or perforating means even though the field passes rapidly by such means.

The apparatus illustrated in FIGS. 2–6 is an exemplary document handling machine which can operate successively on a plurality of documents as such that shown in FIG. 1. Specifically, the machine here illustrated "reads" perforated numerals and supplies a unique electrical output signal for each of the several possible numerical digits which may appear in the document.

By way of background information, the reading machine here shown is of the type more fully disclosed in the copending application of James L. Quinn, Serial No. 768,396, filed October 20, 1958. Because the photoelectric and electronic circuits disclosed in that copending application form no essential part of the present invention, they will not be described in detail. It is sufficient to note only that the machine of FIGS. 2–8 employs a stationarily mounted photoelectric reading head 21 which has a generally rectangular front face 21a sized to be substantially coextensive with a perforation field, such as any of the fields 13a–e in FIG. 1. Whenever one of the perforation fields is alined with the face 21a of the head 21, light from a lamp or source to be described, passes through the particular perforations which exist in that field, and cause photoelectric means to be excited in a corresponding unique combination which identifies the legible numerical character. The output of the photoelectric head 21 passes through a cable 22 (FIG. 3) to electrical circuits (not shown) which are disclosed in the aforementioned copending Quinn application.

The problem arises, in the handling of separate documents, of alining successively each of the perforation fields in successive documents with the reading head 21 in order that an electrical response accurately corresponding to the legible numerical character will be produced. It is essential that each perforation field be almost exactly alined with the coextensive rectangular face 21a of the reading head 21 in order that the photoelectric means within the head will produce a true and accurate response to the number-representing perforations which exist within that field on a document. It is to the solution of this problem that the present invention is directed.

Referring in more detail to FIG. 3, the document handling machine includes as its first major component a mechanism which serves to start documents one at a time into the machine. A large plurality of the documents are assembled in a stack 25 with their rows of feed holes vertically disposed, and are supported on the floor surface 26 of a supply magazine 28. Adjustable side plates 27 (FIG. 2) hold the documents in the stack 25 in a desired position crosswise of the machine. The documents are held upright and urged inwardly by a wobble plate 31 pivoted at 30 to a presser member 29, and bearing against the last document in the stack 25 under the influence of a biasing spring 32 (FIG. 3) engaged with a parallel link assembly 34 interposed between the machine frame and the presser member 29. As documents are taken from the forward (left) end of the stack, the spring 32 and the parallel linkage 34 cause the presser member 29 and the wobble plate 31 to move inwardly and to continue the feeding force on the stack.

In this manner, the foremost document in the stack 25 is brought into engagement with a starting roll 35 which is driven clockwise (as viewed in FIG. 3). A knife edge 36, adjusted in position by a screw 37, is spaced from the surface of a feed roll 38 by a distance which is approximately equal to the thickness of one document.

The feed roll 38 is also driven in a clockwise direction. Thus, the foremost document in the stack 25 is started downwardly with its lower edge entering the space between the knife edge 36 and the feed roll 38. The second document is not immediately started because its lower edge still rests on the floor 26 of the magazine, and the starting roller 35 does not contact that second document until the preceding one has entered the machine.

After passage between the knife edge 36 and the feed roll 38, the leading edge of each document strikes an inclined ramp surface 39 and is deflected to the left (FIG. 3), remaining in engagement with the feed roll 38 so that the entire document is moved outwardly and onto the upper flight 40a of an endless belt 40.

In accordance with the practice of one feature of the present invention, means are provided to bring the row of feed holes 18 (FIG. 1) in each document 10 received from the feeding mechanism into substantial alinement with a reference plane which contains moving pick-up elements, and to advance the documents toward those elements. Such elements are here shown as teeth 41 mounted in circularly spaced relation around the surface of a cylindrical drum 42. The teeth 41 lie in a vertical plane represented by the line 44 in FIG. 2.

To advance documents received successively from the feeding mechanism toward the drum 42 with the feed holes 18 in each document lying substantially in the plane of the teeth 41, i.e., the plane 44, the endless belt 40 is trained over spaced pulleys 40b, 40c and driven, by means to be described, such that its upper flight 40a moves to the left (FIG. 2) and toward the teeth 41. The upper flight 40a of the belt 40 is bounded on either side by guide members 45 and 46 (FIG. 2), the former being slidable on support rods 48, 48a to a limit position under the influence of a tension spring 49. The second guide member 46 is locked, as by set screws 47, in a fixed position such that the inner surface 46a of a flange depending vertically therefrom has reference spacing from the plane 44 of the teeth 41. As shown in FIG. 2, this stationary reference guide surface 46a is parallel to and spaced from the plane 44 by a distance $d_1$, equal to the spacing between the edge 19 and the row of feed holes 18 on the document 10 in FIG. 1. Therefore, if the document 10 is traversed to the left in FIG. 2 by the belt 40 and with its reference edge 19 slidably engaging the surface 46a, the row of feed holes 18 will be alined, in a direction lengthwise of the cylinder 42, with the teeth 41.

To assure that the documents deposited successively on the right end of the belt flight 40a always move toward the drum 42 with their reference edges 19 abutted against and sliding along the reference guide surface 46a, the pulleys 40b, 40c are offset in a direction transverse to the axis of the drum 42, so that the upper flight 40a of the belt is skewed relative to the plane 44 (see FIG. 2) to move toward the guide surface 46a. This assures that as each coupon is advanced by the belt 40 toward the drum 42, it will be shifted transversely until its reference edge 19 is firmly engaged with the guide surface 46a, and the feed holes 18 therein are alined substantially with the teeth 41. As will be pointed out below, it is not necessary that this alinement of the feed holes, in a direction lengthwise of the cylinder 42, be extremely precise. It need only be approximate.

Means are provided to press the coupons against the belt 40, and yet to exert substantially no retarding force on the belt in the absence of coupons. For this purpose, a plurality of spherical metal balls 50 (FIG. 3) are rotatably carried within and project downwardly from a support member 51 disposed above the belt flight 40a. In the absence of coupons on the belt flight, the balls 50 roll freely within the support member 51, and do not impede the movement of the belt 40. On the other hand, as coupons are carried along with the upper flight 40a of the belt, the balls 50 engage the upper surfaces of such coupons and hold them firmly against the belt so that frictional forces cause the coupons to positively move in unison with the belt flight toward the drum 42.

In accordance with a second aspect of the invention, a medium or member having a continuous surface movable in a closed path is provided to carry pick-up elements which are uniformly spaced apart by a distance substantially equal to the spacing of the document feed holes 18, and which are adapted to enter the holes with a self-alining action. That moving medium or member is here shown as the cylindrically shaped drum 42, although it will be apparent to those skilled in the art that an endless belt or the like may be employed in lieu of such drum. The pick-up elements are here embodied by the teeth 41 which are mounted in circularly spaced relation and extend radially from the surface of the drum 42. These teeth 41 are mutually spaced apart by a distance which is substantially equal to the distance between the feed holes 18 in the documents to be handled.

As illustrated best in FIG. 8a, each of the teeth 41 is somewhat pointed or tapered, having a tip which is smoothly rounded and of a diameter considerably less than that of the document feed holes 18. On the other hand, as shown in FIG. 8c, each of the teeth 41 has a root diameter, adjacent the surface of the drum 42, which is substantially equal to the diameter of the document feed holes 18, being only slightly smaller to afford freedom for the document to be brought into conforming engagement with the drum surface.

In keeping with still another aspect of the invention, means are provided to rotationally drive the drum 42 at an angular speed such that its peripheral velocity is different than the approach velocity of the documents, e.g., less than the linear velocity of the belt flight 40a. Such rotational drive means can take a variety of forms known to those skilled in the art, and an exemplary arrangement will be described below. For the time being it is sufficient to note simply by way of example, that the upper flight 40a of the belt 40 may be made to move with a linear velocity of approximately 36 feet per minute, while the peripheral velocity of the drum 42 may be made somewhat different, that is, on the order of 28 feet per minute. Thus, the documents deposited on the belt flight 40a will reach the drum 42 with their leading edges traveling faster than the surface of the drum. This contributes to successful pick-up of the documents and longitudinal alinement thereof relative to the surface of the drum 42.

Alternatively, the rotational drive means may be arranged to drive the drum 42 at an angular speed such that its peripheral velocity is greater than the linear velocity of the belt flight 40a. Merely by way of example, it has been found that successful pick-up of the documents and longitudinal alinement thereof can be promoted when the upper flight 40a is driven with a linear velocity of approximately 24.5 feet per minute, while the peripheral velocity of the drum 42 is made approximately 27.5 feet per minute. In this case, the documents deposited on the belt flight 40a will reach the drum 42 with their leading edges traveling slower than the surface of the drum.

As another important feature of the invention, provision is made to hold or retard the coupon when its leading edge reaches a position adjacent the drum surface. For this purpose, a stationary retarding finger 54 is disposed in closely spaced relation from the surface of the drum 42 and in a position to intercept the leading edges of documents moving on and with the belt flight 40a. As shown in FIG. 5, the finger 54 may be mounted on the forward end of the support member 51, that finger being relatively wide (FIG. 4) and having a downturned end portion 54a which closely approaches the surface of the drum 42. This downturned portion 54a is spaced slightly around the surface of the drum from the terminal portion of the belt flight 40a in the direction in which the drum rotates, i.e., counterclockwise as viewed in FIG. 5.

While the plane in which the upper belt flight 40a lies may be approximately tangential to the cylindrical surface of the drum 42, it is preferably disposed along a plane defined by an extension of the chord 55 (FIG. 5) of a shallow segment of the drum's cross section. In the present instance, therefore, the finger 54 is disposed in a plane which is substantially tangential to the upper portion of the drum 42, and the downturned finger portion 54a is turned in approximately radially relative to the drum surface. The belt flight 40a and the path of movement of documents approaching the drum 42 is along a chord defining a shallow segment in the drum's cross section. Thus, whenever the leading edge of a document leaves the belt flight 40a, it will engage the surface of the drum 42 and be turned or deflected by the drum, and thence continue to move around the drum until it engages the downturned portion 54a of the retarding finger 54.

FIG. 7a illustrates the leading edge of a document just about to engage the surface of the drum 42 as it leaves the belt flight 40a. FIG. 7b shows how the leading edge of the document is deflected upwardly until it engages the retarding finger 54. Because the belt flight 40a is moving at a different speed than the surface of the drum 42, the leading edge portion of the document will be bowed into an upwardly concave configuration. With the drum 42 continuing to rotate, one of the teeth 41 will then slide along the underside of and lift this upwardly concave portion of the document until it reaches the first feed hole 18 therein. When that occurs, the inherent resiliency in the paper of the document will result in the forward edge portion thereof snapping down onto the surface of the drum, with the tooth 41 on the drum entering the first feed hole (FIG. 7c). As this occurs, the engagement of one tooth 41 with the first hole in the document will pull the latter around with the drum's surface (FIG. 7d). The trailing portion of the document will slide relative to the belt flight 40a as the latter moves at a surface speed different than that of the drum surface speed. The document will then be progressively wrapped onto the drum surface with successive teeth 41 entering the successive feed holes in the coupon (FIG. 7d).

It is important to note that this arrangement assures that the document will be engaged on the teeth 41 of the drum 42 even though that document is a separate, relatively short piece of paper. And once the document is firmly located on the drum surface with the teeth 41 engaged in the feed holes 18, then its longitudinal position around the surface of the drum is positively established, at least to the location of the nearest tooth 41.

The tapered teeth 41 also compensate for any slight transverse misalinement which may exist between the document feed holes 18 and the teeth 41 as the latter rides onto drum surface. If it should happen that the reference edge 19 of a document has been cut off or mutilated so that when it engages the guide surface 46a under the urging of the skewed belt flight 40a, the holes 18 are not precisely alined in the plane 44 of the teeth 41, then the holes 18 may initially have the misalined relationship relative to the teeth 41 which is shown in FIG. 8a. However, as the tooth 41 (FIG. 8a) rides upwardly relative to the document 10, its pointed or tapered end will partially enter the feed hole 18 and will engage one edge of that hole. A further downward influence, which tends to force the document against the drum surface, will result in the document being automatically shifted relative to the tooth, such that the feed hole 18 is progressively centered about (FIG. 8b) and ultimately surrounds the root of the tooth 41 (FIG. 8c) with the alinement in a direction lengthwise of the drum 42 having been corrected automatically.

In the handling of commercial documents, such as payment coupons, which have been sent out to customers, and then returned and perhaps passed through the hands of several individuals, it is possible that creases or wrinkles may be created therein. To a large measure, these can be removed by firmly pressing a stack 25 before it is placed in the supply magazine 28. But some resiliency or permanent "set" may remain in those documents which tends to cause them to buckle away from the surface of the drum 42 after they have been engaged with the teeth 41. Any such buckling might cause slight misalinement of at least a portion of the document perforation fields relative to the reading head 21, and make the latter to produce an erroneous response.

To "smooth out" each of the documents which is passed successively around the surface of the drum 42, and bring that document into exact conformity to the circular configuration of the drum surface, means are provided to hold and press each document tightly against the drum surface as that document moves therewith. This is accomplished in the illustrated embodiment by a stationary member held in sliding engagement with the surface of the drum 42. Such member is here shown as a flexible band 61 rigidly anchored at one end and also wrapped around the surface of the drum to be engaged with a tensioning spring 61b (FIGS. 3 and 5). This band 61 has a central slot 61a cut therein to permit free passage of the projecting teeth 41, and thus straddles those teeth to hold the documents firmly pressed against the surface of the drum at points located adjacent the perforation fields on the documents. In this manner, each document is pressed securely into conformity to the cylindrical surface of the drum 42 as it is carried through an arc by that drum, thereby ironing out any creases or wrinkles and stiffening the document by virtue of the curvature therein.

As shown best in FIG. 4, the drum 42 is generally hollow, with the teeth 41 mounted near one end thereof. A central flange 42a is connected to a shaft 42c which is journaled in the machine frame. The left edge of the document is supported on and slides along the arcuate surface 62a of a stationary radius guide 62 mounted on a pin 63 in the machine frame. The guide 62 is spaced axially from the left end of the cylinder 42 by a distance equal to the height of the perforation fields to leave an open slot 64. A second flexible band 60 is pulled into engagement with the surface 62a to hold the edge portions of documents firmly thereagainst.

The slot 64 between the drum 42 and guide 62 are so located in a direction lengthwise of the cylinder 42 relative to the teeth 41 that perforation fields will lie in registry with that slot as each document moves with the drum. The photoelectric reading head 21, mounted as shown in FIGS. 4 and 5, is located with its rectangular face 21a alined with that slot 64, being spaced from the pins 41 by the reference distance $d_2$. Therefore, as each document moves with the drum 42, the perforation fields in that document will successively come into registry with the rectangular face 21a of the head 21.

The photoelectric reading head 21, as more fully disclosed in the above-identified copending Quinn application, contains a plurality of small apertures behind which are located photoelectric cells. Those photoelectric cells are normally ineffective and it makes no difference as to whether or not they receive light from a suitable source such as a lamp 65 mounted within the drum 42 and positioned to project a light beam through the slot 64 toward the face 21a of the head 21. If, however, at the instant that the drum 42 is angularly positioned to bring a single perforation field into registry with the face 21a, the photoelectric cells are made effective, then those cells will be excited in a unique combination for any of the several numerical characters which may be represented by perforations in the field. It is in this manner that the indicia placed on the documents is photoelectrically sensed or "read."

As previously noted, the angled belt flight 40a and the reference guide surface 46a, together with the self-alining action of the tapered teeth 41 (as shown in FIGS. 8a–8c) all cooperate to make certain that the perforation fields in each document are alined in a direction lengthwise of the cylinder 42 with the slot 64 and the rectangular surface 21a of the reading head 21. Moreover, the retarding finger cooperating with the belt flight 40a moving at a different velocity than the surface of the drum 42 accomplishes pick-up of each document so that it is carried with the drum and in precisely spaced relation to the several teeth 41 thereon. In other words, each coupon has been alined in a longitudinal direction about the periphery of the drum surface, because each feed hole in the document is snugly engaged with the root of one of the teeth 41.

For the purpose of rendering the reading head 21 effective at the instants when each perforation field is exactly alined with the rectangular reading face 21a, a plurality of circularly spaced small holes 66 (see FIGS. 3 and 4) are drilled in the flange 42a. The holes 66 each lie on a radial plane passing through one of the teeth 41, so that when one of the holes 66 is in a predetermined angular position, it is known that the corresponding tooth 41 occupies the same angular position. This predetermined angular position is so chosen relative to the reference spacing $d_3$ (FIG. 1) that one of the document fields is alined, in the direction of drum surface motion, with the head face 21a at those instants that one of the teeth is passing through such angular position. Passage of each hole 66 through a predetermined angular position, relative to the stationary reading head 21 is here detected by means of synchronizing photocell 68 located opposite the circular row of holes 66 on the outer side of the flange 42a. Therefore, just at the instant that each perforation field in a document is precisely alined in an angular direction about the drum axis relative to the reading head 21, some light will pass from the lamp 65 through one of the holes 66 and energize or activate the synchronizing photoelectric cell 68. The signal from the latter cell 68 is used (as more fully explained in the aforementioned copending Quinn application) to make the operating means or reading head 21 effective, so that the latter supplies output signals uniquely identifying the perforated numerical character in the field which is opposite its surface 21a.

As the leading edge of each document, moving with the surface of the drum 42, passes beyond the reading head 21, it will engage a stationary stripping finger 70 (FIG. 3) and be deflected downwardly onto the upper flight 71a of a belt 71. Thus, each document after moving past the head 21 on the drum 42 will be deposited on the belt flight 71a, which moves continuously to the right (FIG. 3). The belt is supported at one end by a pulley 72, and driven continuously in a manner to be described. The upper belt flight 71a is bounded by appropriate guide members 74, and a plurality of freely rotatable presser balls 75, similar to the balls 50, urge each coupon into firm engagement with the surface of the belt.

As each document reaches the end of the belt flight 71a, it rides upon a support surface 76 and in between the engaging peripheries of two rotating pull rollers 77, 78. The latter accelerate the document, causing it to be passed into a delivery hopper 79 where it is deposited on the top of a stack of previously handled documents. Thus, each of the documents from the stack 25 is successively fed through the machine, being alined transversely with the pick-up teeth 41, being automatically engaged with those teeth so as to be carried around with the surface of the rotating drum 42 and into precise alinement with the operating means or reading head 21. That reading head 21 supplies electrical responses which can be utilized in any of a variety of ways, either as direct input signals to a "computer" or as controlling signals to a sorter, tabulator, or recording equipment. After each document passes the reading head 21, it is stripped away from the surface of the drum 42, and transported by the belt 71 and the pull rollers 77, 78 to the delivery hopper 79.

While the drive of various continuously rotatable parts in the above-described machine may take a variety of forms, one suitable arrangement will be briefly described. Referring to FIG. 6, an electric motor 85 is mounted on the base of the machine, and has its output shaft 85a connected by an appropriate pulley 86 and belt 87 to a speed reducing pulley 88. The latter is connected by another belt 89 to a journaled gear 90 which drives a mating gear 91. The latter gear meshes directly with a gear 92 integral with the pull roller 77, so that the latter is driven at the proper speed, and by fractional engagement correspondingly drives the mating roller 78. Rigid or integral with the gear 91 is a smaller gear 94 mounted integrally on the pulley 72 which supports the right end of the belt 71. Thus, the belt 71 is driven with its upper flight 71a moving to the right as viewed in FIGS. 3 and 6.

The belt 71 is made to perform the second function of also driving the drum 42. For this purpose, the belt is trained around a tightening roller 95 on a pivoted arm 96 which is biased in a counterclockwise direction by the tension spring 61b. From there, the belt 71 is trained over a stationary pulley 98 located above and inwardly relative to the drum 42. Thus, a portion of the belt 71 is brought into driving engagement with the surface of the drum 42 (FIG. 4), causing the latter to be rotated in a counterclockwise direction (FIG. 3) at the desired speed. Documents 10 moving with the surface of the drum 42 are interposed between the drum and the belt 71 but this does not affect the drive of the drum and does help hold the document in curved conformity with the drum surface.

Meshed with the gear 94 is a larger gear 100 which in turn drives the starting roll 35 through gears 101, 102, 103, 104a and 104. The starting roller 35 is thus continuously driven. The feed roll 38 is made integral or rigid with the gear 103 and thus is also continuously driven in a clockwise direction as viewed in FIG. 6. Finally, a gear 105 integral or rigid with the gear 103 meshes with a mating gear 106 which is integral or rigid with the pulley 40c which supports the right end of the belt 40. With the roller 40c driven in a counterclockwise direction, as shown, the upper belt flight 40a moves to the left as viewed in FIG. 6 at an appropriate speed which is determined by the relative diameters of the several gears. In this manner, all of the rotating parts in the document-reading machine are continuously driven from the single motor 85. By appropriate choice of the diameters of the different gears and pulleys, the linear speed of the belt 40 is made either greater than or less than the peripheral speed of the drum 42, as previously indicated.

Referring now to FIG. 9, a commercial document 110 is there shown to which information is applied in the form of perforations located accordingly to an illegible code. Each vertical space 11, having a width slightly greater than the diameter of a perforated hole constitutes one "field," and can contain up to five perforations in different combinations of vertical positions. Such combinations of holes in different vertical locations can represent different numerical or alphabetical characters according to a predetermined code, for example, the familiar "Flexowriter" code used widely on punched paper tape. A row of large diameter feed holes 112 is provided in the document 110 spaced from a reference edge 114, as previously described in connection with the document 10 in FIG. 1. The feed holes 112 are spaced apart by a distance equal to the width of four vertical perforation fields 111, so that each feed hole 112 serves to locate or establish a reference position for four of the narrow, vertical perforation fields.

The problem arises of feeding a plurality of relatively small documents successively and rapidly past perforating dies which will punch the desired code combinations in the several fields spaced along such documents. In the past, such coded perforations have been used only on long strips of punched paper tape, and it was found practically impossible to make individual, short documents or lengths of paper tape automatically engage the feeding means and line up properly with punching dies.

The apparatus illustrated in FIGS. 10 and 11 constitutes one embodiment of the present invention associated with an otherwise conventional perforating machine for punching coded information of the type shown in FIG. 9. This apparatus includes a supply magazine 28 together with a starting roll 35 and a feed roll 38 which are substantially identical to those previously described in connection with FIGS. 2 and 3. Individual documents are fed by the rolls 35 and 38 from a stack 25 such that they are passed downwardly over an inclined surface 115 and into engagement with one flight 116a of an endless belt 116. This belt is associated with a reference guide surface (not shown), such as the surface 46a in FIG. 2, and skewed or angled relative to that surface as previously described in connection with the belt 40. Rollers 118 carrier by biasing leaf springs 119 normally engage the surface of the belt flight 116a, and serve to press documents against that surface in a manner similar to the operation of the presser balls 50 in FIG. 3.

At the end of the belt flight 116a, a stationary retarding finger 121 is mounted closely adjacent to the surface of the drum 120. The latter is also wrapped and frictionally engaged with a hold-down band 122 similar to the band 61 previously described in connection with FIGS. 3 and 4. Thus, unperforated documents 110 fed successively from the stack 25 will be advanced by the belt flight 116a such that their leading edge is retarded by the finger 121 and the feed holes 112 therein are engaged by radially projecting tapered teeth 124 on the surface of the drum 120. These documents will be picked up by and carried with the teeth 124 in a manner previously described. As each document passes through a partial arc, it will be engaged with a stripping finger 125 and deflected onto a support surface. The leading edge of each document will slide to the right (FIG. 10) along such surface while the trailing edge remains engaged with the teeth 124 on the drum 120.

As each document field passes over the support surface 126, it comes into registry with perforating means to be described in more detail. The feed holes in the leading edge of the document are then engaged with tapered teeth 127 projecting radially from a second drum 128. This latter drum has its surface frictionally engaged by a stationary, flexible band 129, so that the documents are successively carried around that drum until they are engaged by a depending tab 130 and deflected into the entrance chute 131 of a delivery hopper 132.

The first and second drums 120 and 128 are mounted for rotation about spaced, parallel axes. These drums are spaced apart and angularly phased so that when one of the teeth 124 on the first drum 120 is perpendicular to the guide surface 126, then one of the teeth 127 on the second drum 128 will also be correspondingly perpendicular to the guide surface. The spacing of the two drum axes is such that the two simultaneously perpendicular teeth are separated by a distance $d_4$ (FIG. 10) which is a multiple of the spacing between the feed holes 112 in the documents 110 to be accommodated. This assures that as the leading edge of each document leaves the drum 120 and slides along the guide surface 126, the feed holes in the document will accurately line up with and be engaged by the teeth 127 on the second drum 128.

As shown in FIG. 11, the operating means for acting on the documents here comprise a plurality of perforating dies or pins 140 disposed in a row transverse to the guide surface 126 and adapted to be selectively raised in order to perforate different combinations of holes in each field row of documents passing over such guide surface. The perforating pins 140 are located in the plane of a line 141 (FIG. 10) and this plane is located by a distance $d_5$ from the position of the teeth 127 when the latter are disposed perpendicularly to the guide surface 126. As shown in FIG. 9, each of the feed holes is located by a reference spacing $d_5$ from every fourth field row which receives perforated holes. Thus, whenever one of the feed holes 112 is engaged with one of the pins 127 on the drum 128, and that pin is in a perpendicular position, then one of the field rows will be precisely alined with the perforating dies 140. If the drums 120 and 128 are angularly stepped through increments which cause the document to be advanced successively by a distance equal to one-quarter of the spacing $d_5$, then each of the field rows 111 in the document (FIG. 9) will be brought successively into registry with the perforating dies 140.

At this point it will be helpful to understand the general organization and operation of the apparatus for selectively actuating the punching dies 140 so as to perforate any desired coded combination of holes in a given field row. Referring to FIG. 11, a continuously energized motor 145 drives a shaft 146 through a belt 148. The shaft 146 carries a frictionally mounted cam 149 rigidly connected with a concentric shaft 150 mounting a cam 151. So long as a stop pawl 152 is disposed in the path of a radial surface on the cam 149, the latter will slip relative to the shaft 146, and the shaft 150 will remain stationary. However, upon momentary energization of a solenoid 154, the stop pawl 152 will be lowered against the bias of a spring 155, so that the cam 149 will be driven through one revolution with the shaft 146, and will correspondingly drive the shaft 150 and the cam 151 through a single revolution.

The shaft 150 is drivingly connected (by means not shown) to the starting roll 35, the feed roll 38, and one of the pulleys which supports the belt 116. The shaft 150 is also drivingly connected (by means not shown) to another shaft 160 which carries a cam 161 engaged with a follower 162 on a lever 164 pivoted at 165. The cam 161 is so shaped and phased that toward the end of each revolution of the shaft 150, the forward end of the lever 164 will be raised, and will thus raise a connecting bar 166 which extends from the lever 164 pivotally through a plurality of alined die-actuating floating levers 168. Under normal circumstances, elevation of the bar 166 will result in pivoting of the floating levers 168 about pivot connections 169 between their forward ends and heads 170 connected to the lower ends of the corresponding perforating pins 140.

To selectively raise the pins 140, a plurality of selector solenoids 171 are associated with a corresponding plurality of armature levers 172 pivoted at 173 and biased by springs 174 such that their forward ends are urged to lowered positions. The ends of the selector armatures 172 are notched to engage and retain retracted the upper ends of a plurality of interposers 175 which are pivoted on a shaft 176 and biased in a counterclockwise direction (FIG. 11) by tension springs 178. The interposers 175 are normally latched in retracted positions by engagement of their upper tips in notches formed on the undersides of the armature bars 172. However, upon selective energization of certain ones of the solenoids 171, the corresponding ones of the armature bars 172 will be raised, so that the corresponding interposers 175 will rock forwardly under the influence of their associated springs 178, and locate notches 175a in the upper tips of those interposers in overlying engagement with the rear ends of the floating levers 168. When the cam 161 raises the lever 164 and the rod 166, those particular floating levers which are engaged at their rear ends by interposers 175 will pivot about the interposer tips 175a as fulcrums, thereby causing their forward ends to raise and lift the corresponding perforating pins 140. Those particular pins, which correspond to the particular solenoids 171 which were previously energized, will then project upwardly through a die plate 140a above the guide surface 126 to punch holes at selected locations in the document.

Following this punching operation, a second cam 180 on the shaft 160 will momentarily raise a follower lever 181 pivoted at 182. This lever carries a transverse bar 184 disposed beneath the lower portions of the crank-shaped interposers 175. Accordingly, all of the interposers 175 which were previously rocked forwardly, will now be rocked rearwardly in a clockwise direction, so that their upper tips snap back into the notches in the undersides of the biased armature bars 172. The apparatus is then restored to a condition for a second cycle of operation.

In summary, it will be understood that the selector solenoids 171 are first energized in a particular combination to select which ones of the interposers 175 will be released to move forwardly into engagement with the floating levers 168. Next, the solenoid 154 is momentarily energized to permit the cam 149 to be driven through one revolution due to its frictional engagement with the continuously rotating shaft 146. This will result in the shafts 150 and 160 being rotated through one revolution, the cam 161 on the latter shaft raising the bar 166 pivotally connected at the midportions of the floating levers 168, so that those particular floating levers 168 which are engaged by interposers 175 will rock about their rear ends as fulcrum points and raise those particular ones of the perforating pins 140 which correspond to the previously energized solenoids, 171. As soon as the preforating pins 140 have been lowered, the cam 180 raises the lever 181 and the bar 184 to restore the previously released interposers 175 into retracted, latched engagement with the solenoid armature levers 172.

Following the perforation of selected holes in one field row 111 of a document 110, it is necessary to advance the document a distance equal to the width of one field before the next perforating operation takes place. For this purpose, means are provided for successively stepping the first and second drums 120 and 128 in unison by intermittent rotational steps which advance the document along the guide surface 126 by a distance equal to the width of one field row. As here shown, a follower roller 186 (FIG. 10) is engaged with the cam 151 and mounted on one end of a lever 188 pivoted at 189 and connected at its opposite end with a vertically slidable bar 190. Each time that the low point of the cam 151 lets the follower 186 drop under the influence of a biasing spring 191, the bar 190 will be momentarily raised, and then lowered. Pivoted on a pin 193 fixed in the bar 190 and biased by a spring 192 is a double-ended pawl 194 having tips 194a and 194b engaged with the teeth of ratchet wheels 195 and 196 connected rigidly to the respective drums 120 and 128. As seen in FIG. 10, each time that the pawl 194 is elevated, its tip 194a will rotate the ratchet wheel 195 through a predetermined angular increment in a counterclockwise direction, while its tip 194b will rotate the ratchet wheel 196 through a corresponding angular increment in a clockwise direction. Spring-biased detents 198 and 199 retain the ratchet wheels 195 and 196 in their angular positions as the pawl 194 is lowered by the sliding bar 190 and the pawl teeth 194a, 194b slip relative to the ratchet wheels. The low point of the cam 151 is so phased on the shaft 150 that this angular stepping of the two drums 120 and 128 in unison occurs just after the solenoid 154 is energized and the shaft 150 begins its single revolution. Thus, the document engaged with the teeth 124 and 127 on the drums 120 and 128 will be advanced by a distance equal to the width of one field row just before the punching dies 140 are actuated to perforate a coded combination of holes in the next document field. Yet, by virtue of the pawl and ratchet synchronous drive of the two drums, those drums and the document engaged with the teeth thereon will be stationary at the time that the punching pins 140 are actuated.

As previously indicated, the starting and feed rolls 35 and 38, as well as the pulley 116b supporting the belt 116, are driven from the shaft 150, so that as one document leaves the drum 120 another will immediately follow. While such drive connections are not shown because they can take many forms known to those skilled in the art, the ratio of drive to the pulley 116b is such that the average surface speed of the belt is different than the surface speed of the drum 120.

It will be apparent from the foregoing description that the apparatus shown in FIGS. 10 and 11 functions successfully to accept individual documents fed successively from the supply magazine 28, to aline those documents with the operating means here illustrated as punching pins 140, and to actuate such operating means when the fields in the document are successively in registry therewith. While the first and second drums 120 and 128 are not continuously rotated, but are intermittently stepped through predetermined angles and at random timed instants, depending upon the energization of the solenoid 154, the documents will be individually and successively alined with and located on the tapered teeth 124 and 127 of the two drums. This is possible, first, because the belt flight 116a driven in increments from the shaft 150 and the cooperating guide surface (not shown in FIGS. 10 and 11 but corresponding to the surface 46a in FIG. 2) act to shift each document in a direction lengthwise of the cylinder 120 until the row of feed holes 112 in that document are transversely alined with the plane of the teeth 124. Then, as the document is advanced toward the drum 120, its leading edge will engage the retarding finger 121, so that the document will be held substantially stationary, and will slide relatively to the belt flight 116a, until a tooth 124 on the drum 120 enters the first feed hole in the document. By this arrangement, successful handling and alining of separate documents with the perforating pins 140 is accomplished.

FIG. 12 illustrates apparatus quite similar to that of FIGS. 10 and 11, except that the means for operating on documents are perforation "reading" means in the form of feeler pins, rather than perforating means. The document alinement and feeding mechanism of FIG. 12 is identical to that previously described in connection with FIGS. 10 and 11, and thus has been only partially shown and with like reference characters applied to like parts.

To feel or read the combination of holes in each document field, a plurality of vertically movable feeler pins 200 are disposed in a transverse row beneath the guide surface. They are located, with reference to the cylindrical drums 120 and 128 in the same positions as the perforating pins 140 in FIGS. 10 and 11. These feeler pins 200 are normally biased to retracted positions where they rest on the forward ends of relay bars 201.

To effect raising of only those particular pins 200 which lie opposite a hole or perforation in the document field which is alined therewith, the relay bars 201 are pivoted at their rear ends on a common rod 202, and biased upwardly by tension springs 204. The relay bars 201 are normally held depressed against the bias of these latter springs by a plate 205 integral or rigid with an operating lever 206 pivoted on the rod 202 and biased in a counterclockwise direction by a spring 208.

The rear end of the operating lever 206 carries a cam follower 209 engaged with a cam 210 mounted on a shaft 211 which is given one revolution each time that the perforations on a given document field are to be read. The shaft 211 corresponds substantially to the shaft 160 in FIG. 11.

Each time after a perforation field in a document has been placed in registry with the retracted feeler pins 200, i.e., after the drums 120 and 128 have been advanced by one angular increment, the low portion of the cam 210 permits the operating lever 206 to rock clockwise as viewed in FIG. 12, so that the plate 205 is lifted free of the relay bars 201. Accordingly, those relay bars which are associated with pins 200 which lie beneath perforations in the document will swing upwardly under the influence of their springs 204, with the pins passing through perforation holes. Those relay bars which are associated with pins 200 which do not lie opposite a perforation in the document will be blocked from such upward movement.

Associated with the respective relay bars 201 are actuating levers 214, all pivoted on a rod 215 and having lower operating fingers 216 engaged with leaf spring contacts 218 disposed opposite stationary contacts 219 of corresponding switches. The upper ends of the switch-operating levers 214 are normally engaged with lugs on the forward ends of the relay bars 201, being held in angular positions about the rod 215 such that their tips 216 hold the leaf spring contacts 218 away from the stationary contacts 219. Spreader bars 220 are disposed adjacent the upper ends of the operating levers 214 and normally prevent angular movement of those levers.

When the operating lever 206 swings clockwise to raise the plate 205 and permit those ones of the relay bars 201 associated with pins 200 which lie opposite perforations to rise, a cam 221 disposed between the spreader bars 220 is lifted free of such bars, so that the upper ends of the switch-operating levers 214 which are cleared by those ones of the relay bars 201 which are raised, can be angularly deflected under the biasing force of the associated leaf spring switch contact 218. Accordingly, those ones of the several switches 218, 219 which correspond to the particular combination of holes in a document field will be momentarily closed. The switch-operating arms 214 which are engaged with relay bars 201 that are not raised, will be retained in their original positions by engagement with such relay bars, and will not move to permit closure of the associated switch contacts when the spreader bars 220 are given freedom to move toward one another.

After that particular combination of switches 218, 219 corresponding to holes which appear in a perforation field have been closed momentarily, the operating lever 206 is returned to its original position by the cam 210. Accordingly, the cam member 221 again is inserted between the spreader bars 220, and the latter shift those ones of the switch-operating levers 214 which were deflected back to their original positions, thereby reopening those switches 218, 219 which were momentarily closed. Following this, the plate 205 is lowered with the forward end of the lever 206, and shifts the previously raised relay bars 201, and their associated feeler pins 200, downwardly to their original positions. The apparatus is then in readiness to perform another cycle of operation.

The manner in which the momentary closure of the different switch contacts and different combinations is utilized to convey the intelligence represented by the perforations in the document being read is well known to those skilled in the art and will not be described in further detail.

FIGS. 2–8 show the application of the present alinement means to a machine for photoelectrically reading legible perforated characters placed in perforation fields on separate documents. The apparatus illustrated by FIGS. 10 and 11 shows the novel alinement means as applied to a perforating machine which can accept separate documents and not only successively perforate different combinations of holes in perforation fields, but make certain that those perforation fields are accurately alined with the perforating pins. Finally, the apparatus in FIG. 12 makes it clear that the present alinement means, in the form shown in greater detail by FIGS. 10 and 11, can be applied with equal success to a mechanical feeler type of perforation reading machine. Through the addition of the automatic alinement apparatus, such a machine is adapted to successively receive a plurality of documents having coded perforations therein, the perforation fields in each document being successively alined with feeling or reading pins which control the closure of switches to produce electrical signals corresponding to the intelligence represented by the coded perforations.

The present application is a continuation of applicant's copending application Serial No. 768,408, filed October 20, 1958, now abandoned.

I claim:

1. In a machine for operating on fields occupying parts of the total area of separate documents, said documents each having a row of feed holes uniformly spaced therealong with each field having a reference spacing from one of said holes, the combination comprising a cylindrical drum, means for rotationally driving said drum, an array of tapered teeth radially projecting from said drum and circularly spaced apart in conformity with the spacing of said feed holes, means for feeding documents one at a time toward the surface of said drum, said last means including means for posturing each document such that the row of feed holes therein is generally alined in a direction lengthwise of said drum with said teeth, means for retarding the leading edge of each document as it reaches the surface of said drum so that one of said teeth enters the first hole in the document, means for pressing each document against the surface of said drum as said teeth move the document with said surface, normally ineffective means for operating on the fields of said documents, means mounting said operating means with reference spacing from said teeth in a direction lengthwise of said drum and at a selected angular position about the axis of said drum, and means for rendering said operating means effective when each of said teeth is in a predetermined angular position as said drum rotates.

2. In a machine having a device for operating on fields occupying a part of documents, said documents each having a row of uniformly spaced feed holes alined a predetermined distance from one edge, each of the fields in said documents having a reference spacing from one of said feed holes, apparatus for alining the fields in successive documents with said operating device comprising, in combination, a cylindrical drum, means for rotating said drum, a circular array of tapered teeth projecting radially from said drum to engage with the feed holes in the documents, an endless belt and means for driving the same with a surface speed in excess of the peripheral speed of said drum, means supporting said belt with one flight thereof moving toward and terminating adjacent the surface of said drum, a stationary guide disposed along one edge of said belt flight and disposed at right angles to the axis of said drum, said belt flight being skewed to approach said guide as it moves toward said drum, means for depositing documents one at a time on said belt flight so that their one edges are moved into engagement with said guide and they are advanced toward said drum, means for retarding the leading edge of each document as it reaches the surface of the drum so that one of the sprocket teeth enters the first feed hole in that document, means for holding the documents firmly against the surface of said drum as they are moved with the latter by said teeth, means mounting said operating device with reference spacing from the plane of said teeth, and means for rendering said operating device effective as each of said teeth is in a predetermined angular position, so that the operating element when effective is alined with a field in a document.

3. In a machine having a device for operating on perforation fields occupying a part of documents, said documents having a row of uniformly spaced round feed holes of a first diameter therein with each perforation field having a predetermined reference spacing from one of said holes, said row of holes being spaced uniformly from one edge of each document, the combination comprising a cylindrical drum, means for rotating said drum, a circular array of teeth projecting radially from said drum and uniformly spaced therearound by a distance equal to the spacing between said feed holes, each of said teeth being tapered and having tip and root diameters respectively smaller than and substantially equal to said first diameter, an endless belt and means supporting the same with one flight thereof leading to the periphery of said drum and disposed in a plane defined by the chord of a shallow segment of the cross section of the drum, means for driving said belt so that said flight moves toward said drum at a linear speed in excess of the peripheral speed of said drum, a guide disposed on one side of said belt flight and lying at right angles to the axis of said drum, said guide also being spaced from said teeth along said axis by a distance equal to the spacing of said feed holes from the said one edge of each document, said belt flight being angled within said plane to move toward said guide, means for successively feeding documents one at a time onto said belt flight so that the latter moves the said one edge of each document into sliding contact with said guide and advances each document toward said drum, a stationary retarding finger disposed in closely spaced relation to the surface of said drum in a position to intercept the leading edges of documents moving with said belt, a stationary band engaging and partially wrapping the surface of said drum to hold documents against such surface as they move away from said retarding finger with said teeth engaged in the feed holes, means mounting said operating device with a predetermined reference spacing from the plane in which said teeth lie, and means for rendering said operating device effective only when each of said teeth is in a predetermined angular position.

4. In a machine for operating on fields of separate documents passed successively therethrough, said documents each having a row of feed holes therein, the combination comprising a medium having a continuous movable surface, means for moving said surface along a closed path, a row of tapered teeth projecting from said surface, and spaced apart parallel to the direction of surface movement by distances equal to the spacing of said feed holes, a stationary retarding finger closely spaced from said surface, and means for successively feeding documents toward said surface so that the leading edges thereof will engage said finger, whereby the said teeth will progressively engage the feed holes in each document and carry the same around with said surface.

5. In a machine for operating on predetermined partial areas of separate documents, said documents each having a row of feed holes therein located with reference to said areas, the combination comprising a medium having a continuous movable surface, means for moving said surface along a closed path, an array of tapered teeth circularly spaced along and projecting radially from said surface, a stationary retarding finger spaced adjacent said surface, means for successively feeding documents toward a point on said surface which is approaching said finger, said feeding means being positioned to make each document approach said surface with the row of holes therein substantially alined with the plane in which all of said teeth lie, said feeding means including means for giving the documents a linear velocity greater than the speed of said surface, so that as the leading edge of each document reaches said surface it is deflected into engagement with said finger and retarded by such finger until the next tooth on the surface enters the first feed hole in the document.

6. In a machine for operating on predetermined partial areas of separate documents, said documents each having a row of feed holes therein located with reference to said areas, the combination comprising a medium having a continuous movable surface, means for moving said surface along a closed path, a plurality of tapered teeth spaced along and projecting from said surface, means for engaging said teeth in the feed holes of successive documents, and a stationary yieldable member slidably engaging a portion of said surface and positioned such that said documents slide under said member as they travel with said surface, whereby said documents are pressed into wrinkle-less conformity to the surface.

7. The combination set forth in claim 6, further characterized in that said stationary member is a flexible band having an elongated slot therein, said band being held taut to engage said surface and positioned such that said teeth pass through said slot as the surface moves.

8. In a machine for reading legible perforated characters in fields of separate documents, said documents each having a row of uniformly spaced feed holes therein, each perforation field having reference spacing from one of said feed holes, the combination comprising a cylindrical drum, means for rotating said drum, an array of circularly spaced tapered teeth projecting radially from the surface of said drum, an arcuate guide spaced from the end of said drum to define a slot having reference spacing from said teeth, a photoelectric reading head mounted in registry with said slot, means for feeding said documents one at a time toward the surface of said drum with the feed holes therein substantially alined with the plane of said teeth, and at a speed in excess of the peripheral speed of said drum, means for retarding the leading edge of each document just after it reaches the surface of said drum so that the first feed hole in each document is entered by one of said teeth, a light source within said slot to project a light through perforations in document fields to said head, and means for holding said documents firmly against the surfaces of said drum and guide while the documents are moved past said head.

9. In a machine for operating on successive rows of perforation fields in separate documents, said documents each having a row of uniformly spaced feed holes therein which extends transversely to said perforation field rows and with reference spacing from such field rows, the combination comprising first and second cylindrical drums having parallel axes, means for successively stepping said drums in unison by intermittent equal rotation steps which advance the peripheries of the drums by distances equal to the width of one field row, first and second arrays of tapered teeth circularly spaced around and projecting radially from the surfaces of said first and second drums, respectively, said arrays of teeth lying in a common plane, means for feeding documents in steps successively toward the surface of said first drum with the feed holes in each document substantially alined with said plane, said feeding means including means for traversing each document at a linear speed in excess of the peripheral speed of said first drum, means including a finger adjacent the surface of said first drum for engaging and retarding the leading edge of each document until one of said first teeth enters the first feed hole in that document and carries the latter around with the first drum surface, means for holding each document firmly against the surface of said first drum as the latter turns through a predetermined angle, a flat support surface extending between and substantially tangentially to said drums, said drums being spaced apart and angularly phased so that a tooth on said first drum is perpendicular to said guide surface when each tooth on said second drum is correspondingly perpendicular and so that such simultaneously perpendicular teeth are spaced apart by a multiple of the spacing between document feed holes, means for operating on the perforation field rows of documents, means mounting said operating means with reference spacing along said guide surface relative to such perpendicular teeth, and means for actuating said operating means at instants when said drums are stationary in predetermined angular positions which make each document field row lie in registry with said operating means.

10. In a machine for operating on successive rows of perforation fields in separate documents, said documents each having a row of uniformly spaced feed holes therein which extends transversely to said perforation field rows and with reference spacing from such field rows, the combinations comprising first and second cylindrical drums having parallel axes, means for successively stepping said drums in unison by intermittent equal rotational steps, first and second arrays of tapered teeth circularly spaced around and projecting radially from the surfaces of said first and second drums, respectively, means for feeding documents successively toward the surface of said first drum with the feed holes in each document substantially alined in a direction lengthwise of the drum with said first teeth so that one of said first teeth enters the first feed hole in each document and carries the latter around with the first drum surface, a guide surface extending between and substantially tangentially to said drums for transferring documents from the first drum to the second, means for operating on the perforation field rows of the documents, means mounting said operating means with reference spacing along said guide surface relative to the axes of said drums, and means for actuating said operating means at instants when said drums are stationary in predetermined angular positions which make each field row lie in registry with said operating means.

11. In a machine for operating on successive rows of perforation fields in separate documents, said documents each having a row of uniformly spaced feed holes therein which extends transversely to said perforation field rows and with reference spacing from such field rows, the combination comprising first and second cylindrical drums having parallel axes, pawl and ratchet means for successively and synchronously stepping said drums in unison by intermittent equal rotational steps, first and second arrays of tapered teeth circularly spaced around and projecting radially from the surface of said first and second drums, respectively, means for feeding documents successively toward the surface of said first drum with the feed holes in each document substantially alined in a direction lengthwise of the drum with said first teeth, means for engaging and retarding the leading edge of each document until one of said first teeth enters the first feed hole in that document and carries the latter around with the first drum surface, a flat guide surface extending between and substantially tangentially to said drums for transferring documents from the first to the second drum, said drums being spaced apart and angularly phased so that a tooth on said first drum is perpendicular to said guide surface when each tooth on said second drum is correspondingly perpendicular and so that such simultaneously perpendicular teeth are spaced apart by a multiple of the spacing between document feed holes, means for operating on the perforation field rows of the documents means mounting said operating means with reference spacing along said guide surface relative to such perpendicular teeth, and means for alternately driving said pawl and ratchet means and actuating said operating means so that each document field row is registered with said operating means when the latter are actuated.

12. In a machine for operating on successive rows of perforation fields in separate documents, said documents each having a row of uniformly spaced feed holes therein, the combination comprising first and second cylindrical drums having parallel axes, means for successively stepping said drums in unison by intermittent equal rotational steps, first and second arrays of tapered teeth circularly spaced around and projecting radially from the surfaces of said first and second drums, respectively, means for feeding documents successively toward the surface of said first drum with the feed holes in each document substantially alined in a direction lengthwise of the drum with said first teeth, and means for transferring each document from engagement with the teeth on the first drum to engagement with the teeth on said second drum.

13. The combination set forth in claim 9 further characterized in that said operating means comprises a plurality of perforating pins actuated in selectable combinations to punch perforations in the document field rows.

14. The combination set forth in claim 9 further characterized in that said operating means comprises a plurality of feeler pins brought into engagement with each document field row, and means for electrically signalling which ones of said pins finds and passes through a perforation.

15. In a machine for reading characters represented by light-transmissive indicia in the fields of separate documents, said documents each having a row of uniformly spaced feed holes therein with each character field having reference spacing from one of said feed holes, the combination comprising a cylindrical drum, means for rotating said drum, an array of teeth projecting from and spaced around said drum in a plane perpendicular to the axis of drum rotation, means for feeding said documents successively toward the surface of said drum with the document feed holes substantially alined in said plane, said last-named means causing said documents to approach said drum along a chord of a shallow arc of the drum is bent in the direction of drum surface movement to en- cross-section so that the leading edge of each document gage said teeth in the feed holes, a light source, a photoelectric reading head, means for mounting said head and source so that the character fields of documents carried on said drum surface pass between the two, means for holding said documents firmly in curved conformity with the surface of said drum as said documents pass between said source and head, and means for sensing the response of said reading head only at those instants when one of said teeth has reference spacing circumferentially of the drum from said head.

16. In a machine for operating on the fields of successive documents each of which has a row of feed holes with reference spacing from the fields, the combination comprising first and second cylindrical drums rotatable about parallel axes, means for rotating said drums in unison, first and second arrays of tapered teeth respectively circularly spaced around and projecting radially from the surfaces of said first and second drums, means for feeding documents successively toward the surface of said first drum with the feed holes in each document substantially alined in a direction lengthwise of the drum with said teeth, means for guiding the leading edge of each document from said first drum toward said second drum so that said second teeth engage the feed holes in the document, means disposed along said guide means for operating on the document fields, and means for actuating said operating means when one of said first teeth has reference spacing in the direction of document movement from said operating means.

17. In a machine for operating on fields of separate documents passed successively therethrough, said documents each having a row of feed holes spaced uniformly and each of which has reference spacing, in a direction parallel to the row, from one of said fields; the combination comprising a continuous movable surface and means for moving the same, a plurality of tapered teeth projecting from said surface and spaced apart along said surface to move in a common plane, the spacing between said teeth corresponding to the spacing of said feed holes, means for feeding documents successively toward said surface and making said teeth enter the feed holes in such documents so that the latter are positioned on said surface by said teeth, normally inactive means adjacent to said surface for operating on said documents while they are on the surface, and means for activating said operating means at instants when one of said teeth has reference spacing, in the direction of tooth movement, from said operating means.

18. In a machine for operating on fields of separate documents passed successively therethrough, said documents each having a row of feed holes therein which are uniformly spaced apart and have reference spacing from said fields, the combination comprising a cylindrical drum rotatable about its longitudinal axis, a plurality of tapered teeth projecting radially from said drum and disposed in a plane radial thereto, the spacing between said teeth circumferentially of the drum corresponding to the spacing of said feed holes, means for feeding documents successively toward said drum and making said teeth enter the feed holes in such documents to position the latter on the drum, means disposed adjacent the periphery of said drum for operating on said document fields, and means for activating said operating means when one of said teeth is in an angular position that has reference spacing, circumferentially about said drum, from said operating means so that the field is registered with the operating means.

19. In apparatus for handling flexible documents each of which has a row of uniformly spaced feed holes therein, an endless surface and means for moving the same along a path which is at least in part along an arc, a plurality of teeth projecting from said surface and uniformly spaced apart in the direction of surface movement by distances equal to the spacing of said feed holes, means for feeding said documents successively toward said surface with the feed holes substantially alined with said teeth in a direction transverse to the direction of surface movement, said feeding means including means for disposing each document in a flat condition and in a plane oriented along a chord of the arc along which said surface moves, so that the leading edge of each document is flexed upon engagement with said surface in the direction of movement of such surface.

20. In apparatus for handling flexible documents each of which has a row of uniformly spaced feed holes therein, a cylindrical drum rotatable about its axis, a plurality of teeth projecting radially from said drum and uniformly spaced circumferentially therearound by distances equal to the spacing of said feed holes, said teeth being disposed in a plane normal to said drum axis, means for feeding said documents successively toward said drum with the rows of feed holes substantially alined with said plane, said feeding means including means for moving each document in a flat plane which lies along a chord of the circular cross section of the drum so that the first action of the drum upon engagement therewith by the leading edge portion of a document is to bend that leading edge portion in the direction of the drum movement.

21. In a machine for operating on fields occupying parts of the total area of separate documents passed therethrough, said documents each having a row of feed holes therein, the combination comprising, a first member having an endless surface, means for driving the endless surface of said first member at a predetermined speed, a plurality of alined teeth spaced along and projecting from said surface for engagement with the feed holes in said document, a second member having an endless surface for advancing said documents toward said first member with said feed holes alined with said teeth, and means for driving the endless surface of said second member at a speed different than the speed of said first member.

22. In a machine for operating on fields of separate documents passed successively therethrough, said documents each having a row of feed holes spaced uniformly and each of which has reference spacing, in a direction parallel to the row, from one of said fields; the combination comprising, a first continuous movable surface and means for moving the same at a predetermined speed, a plurality of tapered teeth projecting from said surface and spaced apart along said surface to move in a common plane, the spacing between said teeth corresponding to the spacing of said feed holes, a second continuous movable surface for advancing documents successively toward said first surface with said holes alined with said teeth, means for moving said second surface at a different speed than said first surface, and means for retarding the leading edge of each document so that said teeth are engaged with the feed holes in said documents to position the latter on said first surface.

23. In a machine for reading perforated characters in fields of separate documents, said documents each having a row of uniformly spaced feed holes therein, the combination comprising, a cylindrical drum, means for rotating said drum, means axially spaced from one end of said drum and defining therewith an arcuate slot, a photoelectric reading head mounted in registry with said slot, a plurality of circularly spaced tapered teeth disposed evenly along and projecting from the surface of said drum for engagement with the feed holes in each of said documents, said teeth being positioned so that said document fields traverse said slot upon engagement with the teeth, an endless belt for successively advancing said documents toward said drum with said feed holes alined with said teeth, means for retarding the leading edge of each document just after it reaches the surface of said drum so that one of said teeth is effectively engaged with one of said feed holes, means for driving said belt at a different speed than the peripheral speed of said drum, and a light source for projecting light through the perforations in said document fields to said head.

24. In a machine for operating on fields occupying parts of the total area of separate documents passed therethrough, said documents each having a row of feed holes therein, the combination comprising, a first member having an endless surface, means for driving the endless surface of said first member at a predetermined speed, a plurality of alined teeth spaced along and projecting from said surface for engagement with the feed holes in said document, a second member having an endless surface for advancing said documents toward said first member with said feed holes alined with said teeth, means for driving the endless surface of said second member at a speed slower than the speed of said first member, and means for retarding the leading edge of each document so that said teeth engage the feed holes therein and position such documents on the endless surface of said first member.

25. In a machine for reading legible perforated characters in fields of separate documents, said documents each having a row of uniformly spaced feed holes therein, the combination comprising, a cylindrical drum, means for rotating said drum, means axially spaced from one end of said drum and defining therewith an arcuate slot, a photoelectric reading head mounted in registry with said slot, a plurality of circularly spaced tapered teeth disposed evenly along and projecting from the surface of said drum for engagement with the feed holes in said documents, said teeth arranged to position each document on the surface of said drum with its associated field overlying said slot, an endless belt for advancing said documents toward said drum with said feed holes alined with said teeth, means for driving said belt at a speed slower than the peripheral speed of said drum, and a light source for projecting light through the perforations in each of said document fields to said head.

26. In a machine for operating on fields of separate documents passed successively therethrough, said documents each having a row of feed holes spaced uniformly and each of which has reference spacing, in a direction parallel to the row, from one of said fields; the combination comprising, a first continuous movable surface and means for moving the same at a predetermined speed, a plurality of tapered teeth projecting from said surface and spaced apart along said surface to move in a common plane, the spacing between said teeth corresponding to the spacing of said feed holes, a second continuous movable surface for advancing documents successively toward said first surface with said holes alined with said teeth, means for moving said second surface at a speed slower than said first surface so that said teeth are engaged with the feed holes in said documents to position the latter on said first surface, and means for maintaining said documents in smooth conformity with respect to said first continuous movable surface.

27. In a machine for reading characters represented by light-transmissible indicia in the fields of separate documents, said documents each having a row of uniformly spaced feed holes therein with each character field having reference spacing from one of said feed holes, the combination comprising, a cylindrical drum, means for rotating said drum, an array of teeth projecting from and spaced around said drum in a plane perpendicular to the axis of drum rotation, a continuous surface for advancing said documents successively toward the surface of said drum with the document feed holes substantially alined in said plane, means for moving said surface at a speed slower than the peripheral speed of said drum, means for retarding the leading edge of each document so that said teeth are engaged in the feed holes, a light source, a photoelectric reading head, means for mounting said head and source so that the character fields of documents carried on said drum pass between the two, and means for sensing the response of said reading head only at those instances when one of said teeth has reference spacing circumferentially of the drum from said head.

References Cited in the file of this patent

UNITED STATES PATENTS

| | | |
|---|---|---|
| 2,637,399 | Doty | May 5, 1953 |
| 2,729,136 | Feick et al. | Jan. 3, 1956 |
| 2,845,122 | Lake et al. | July 29, 1958 |
| 2,849,916 | Nolan | Sept. 2, 1958 |
| 2,879,993 | Scozzafava | Mar. 31, 1959 |

UNITED STATES PATENT OFFICE
CERTIFICATE OF CORRECTION

Patent No. 3,033,445

May 8, 1962

William H. Dreyer

It is hereby certified that error appears in the above numbered patent requiring correction and that the said Letters Patent should read as corrected below.

Column 1, line 12, for "heerin" read -- herein --; column 4, line 12, for "as such" read -- such as --; column 10, line 57, for "accordingly" read -- according --; line 58, for "11" read -- 111 --; column 11, line 23, for "carrier" read -- carried --; column 20, line 18, strike out "is bent in the direction of drum surface movement to en-" and insert the same after "each document" in line 19, same column 20.

Signed and sealed this 12th day of March 1963.

(SEAL)
Attest:

ESTON G. JOHNSON
Attesting Officer

DAVID L. LADD
Commissioner of Patents